United States Patent
Tanaka et al.

(10) Patent No.: US 7,990,426 B2
(45) Date of Patent: Aug. 2, 2011

(54) PHASE ADJUSTING DEVICE AND DIGITAL CAMERA

(75) Inventors: Nozomi Tanaka, Osaka (JP); Masahiro Ogawa, Osaka (JP)

(73) Assignee: Panasonic Corporation, Osaka (JP)

( * ) Notice: Subject to any disclaimer, the term of this patent is extended or adjusted under 35 U.S.C. 154(b) by 623 days.

(21) Appl. No.: 12/019,367

(22) Filed: Jan. 24, 2008

(65) Prior Publication Data

US 2008/0174671 A1     Jul. 24, 2008

(30) Foreign Application Priority Data

Jan. 24, 2007   (JP) .................. 2007-013678

(51) Int. Cl.
*H04N 5/235*   (2006.01)
*G06K 9/40*    (2006.01)

(52) U.S. Cl. ..................... 348/221.1; 382/274
(58) Field of Classification Search ........... 348/222.1, 348/221.1, 229.1, 230.1, 224.1; 382/274
See application file for complete search history.

(56) References Cited

U.S. PATENT DOCUMENTS

| | | | |
|---|---|---|---|
| 5,406,329 A | | 4/1995 | Kashimura et al. |
| 5,940,530 A | * | 8/1999 | Fukushima et al. .......... 382/164 |
| 6,160,578 A | | 12/2000 | Carroll et al. |
| 6,664,973 B1 | * | 12/2003 | Iwamoto et al. ............. 345/589 |
| 7,432,962 B2 | * | 10/2008 | Oda et al. ................. 348/229.1 |
| 7,580,064 B2 | * | 8/2009 | Deguchi et al. ............ 348/231.7 |
| 2006/0284996 A1 | * | 12/2006 | Kanai et al. ................. 348/294 |
| 2007/0273785 A1 | | 11/2007 | Ogawa et al. |

FOREIGN PATENT DOCUMENTS

| | | |
|---|---|---|
| JP | 2003-18477 | 1/2003 |
| JP | 2005-151081 | 6/2005 |
| WO | WO 2006/049098 A1 | 5/2006 |

OTHER PUBLICATIONS

Chinese Office Action issued in Chinese Patent Application No. CN 200810000226.6 dated Aug. 31, 2010.

* cited by examiner

*Primary Examiner* — Lin Ye
*Assistant Examiner* — Trung Diep
(74) *Attorney, Agent, or Firm* — McDermott Will & Emery LLP

(57) ABSTRACT

The timing adjustment unit gives a phase adjustment instruction of the pulse to the imaging device so as to converge to an optimum phase of the pulse set based on the calculation results of the luminance level detecting unit and the variance calculating unit. Furthermore, the timing adjustment unit controls the imaging device so that an exposure state of the analog imaged signal is suited for a luminance level detection process by the luminance level detecting unit and the variance calculation process by the variance calculating unit.

4 Claims, 16 Drawing Sheets

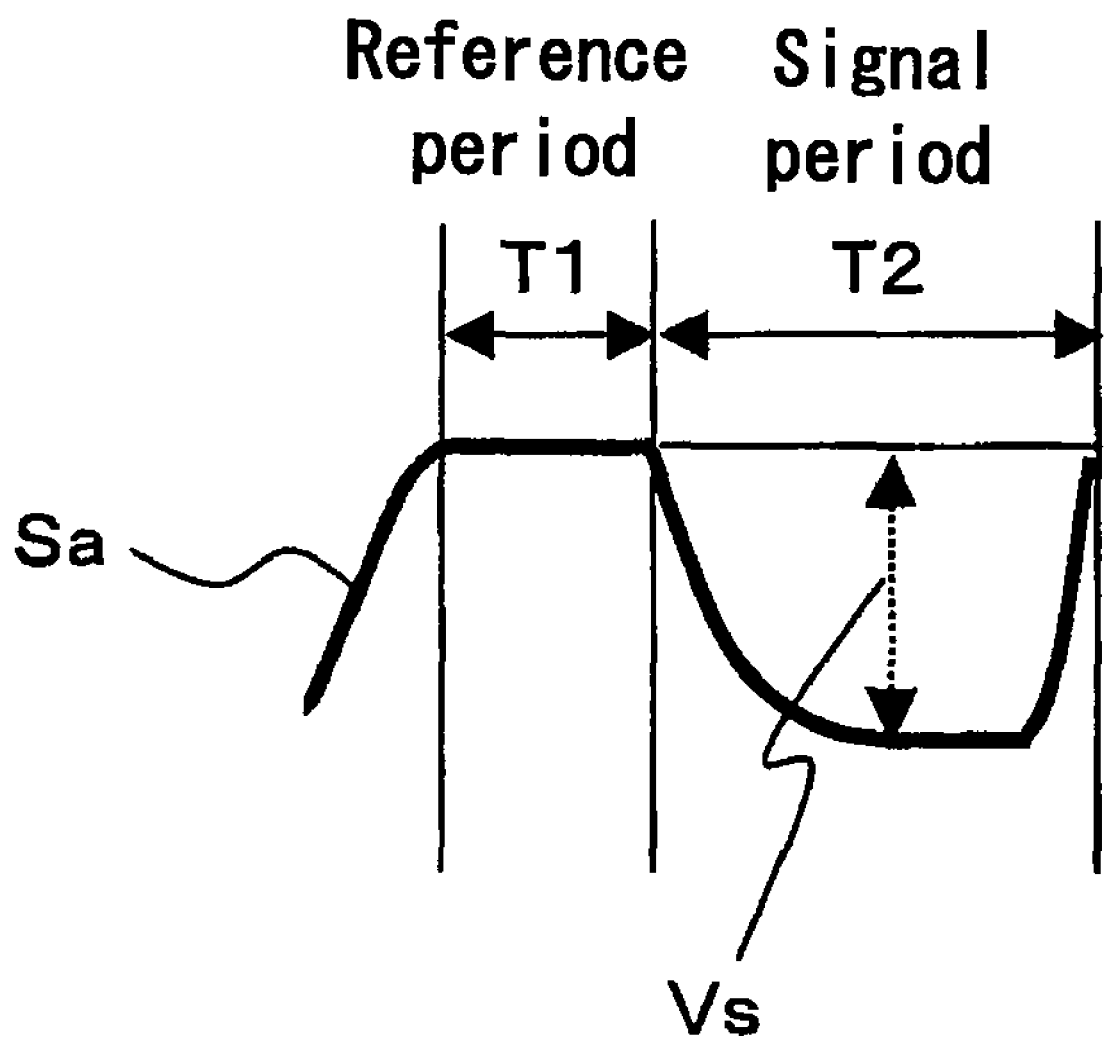

FIG. 3B

Set value of each pulse in time of adjustment

| Pulse to be adjusted | DS2 set value | DS1 set value | ACK set value |
|---|---|---|---|
| DS2 | <Adjustment Value> | Initial value | Initial value |
| DS1 | Optimum value | <Adjustment Value> | Initial value |
| ACK | Optimum value | Optimum value | <Adjustment Value> |

FIG. 3A

S1: Measure DS2 data
S2: Evaluate DS2 data / Determine optimum value
S3: Measure DS1 data
S4: Evaluate DS1 data / Determine optimum value
S5: Measure ACK data
S6: Evaluate ACK data / Determine optimum value
S7: Set optimum phase F I G. 8
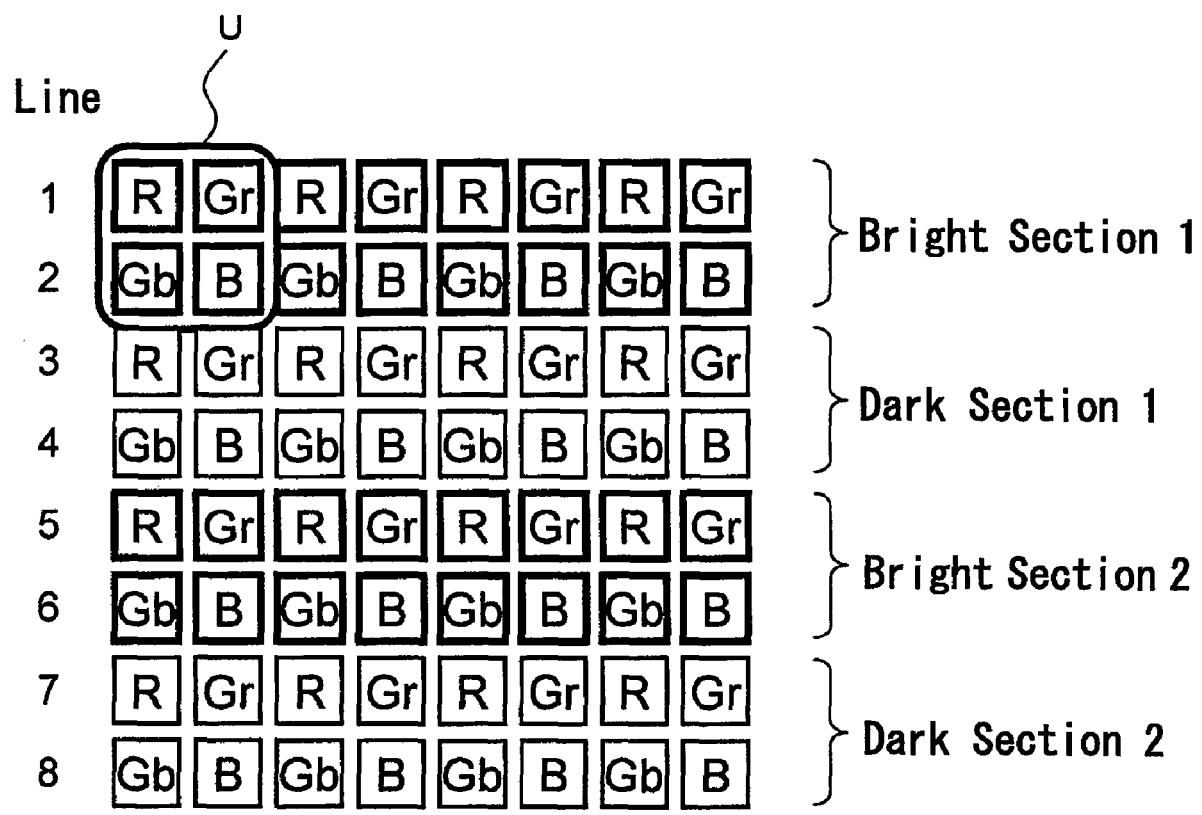

PHASE ADJUSTING DEVICE AND DIGITAL CAMERA

BACKGROUND OF THE INVENTION

1. Field of the Invention

The present invention relates to a phase adjusting device for performing phase (timing) adjustment of a pulse used for imaging in a digital camera, and a digital camera incorporating the phase adjusting device.

2. Description of the Related Art

In digital cameras (digital still camera, digital video camera, portable telephone with camera, and the like), an analog imaged signal that is imaged by an imaging element such as CCD and MOS image sensor is converted to a digital imaged signal, and such digital imaged signal is recorded after being subjected to a predetermined signal process. The pulse for driving the imaging element, the pulse for detecting the signal level, and the like are required to image the subject with the imaging element. Since the phase of such pulses has variations originating from manufacturing, it is difficult to adjust the pulse phase when designing hardware. Thus, the technicians perform phase adjustment after manufacturing, store information indicating the adjusted phase in a storage region, and thereafter, read out the phase information from the storage region in actual use to set the optimum phase.

A technique of mainly retrieving noise component with the exposure time at a minimum and adjusting the phase under the condition the high frequency component (noise component) becomes a minimum is conventionally known (see e.g., Japanese Laid-Open Patent Publication No. 2005-151081).

In the field of digital cameras, a system for incorporating the phase adjusting device is sometimes changed. In particular, in the field of medical cameras and the like, the imaging element is sometimes replaced after the digital camera is manufactured. If the incorporating system or the imaging element differs, the phase of the pulse for driving the same obviously differs, and thus the phase must be readjusted. However, it is difficult to rapidly and easily change the incorporating system and replace the imaging element if the technicians are manually readjusting the phase.

Although the pulse to be adjusted exists in a plurality of types, the respective optimum phase is obtained with the same method for all the pulses without taking into consideration the characteristics of each pulse in the Japanese Laid-Open Patent Publication mentioned above, and thus the accuracy is not very high.

Furthermore, in-vehicle camera etc. is also being widely used in recent years, and the optimum phase might greatly change due to temperature characteristics.

SUMMARY OF THE INVENTION

Therefore, it is a main object of the present invention to more rapidly and easily adjust the phase of the pulse for driving the imaging element compared to the case where technicians make the adjustment manually irrespective of the change in photographing conditions (temperature, voltage, etc.) surrounding the digital camera even when the incorporating system is changed or the imaging element is replaced, and also to enhance the accuracy of the phase adjustment.

In order to achieve the above object, a phase adjusting device of the present invention relates to a phase adjusting device for adjusting a phase of a pulse used in imaging in an imaging device based on a digital imaged signal obtained by converting an analog imaged signal from the imaging device to a digital value for every pixel; the phase adjusting device including a luminance level detecting unit for detecting a luminance level of the digital imaged signal for a plurality of pixels within a first pixel region of the imaging device; a variance calculating unit for calculating a variance indicating signal variation between pixels in the digital imaged signal for a plurality of pixels in a second pixel region of the imaging device; and a timing adjustment unit for giving a phase adjustment instruction of the pulse to the imaging device so as to converge to an optimum phase of the pulse set based on the calculation results of the luminance level detecting unit and the variance calculating unit, and controlling the imaging device so that an exposure state of the analog imaged signal is suited for a luminance level detection process by the luminance level detecting unit and a variance calculation process by the variance calculating unit.

According to such configuration, the luminance level detecting unit detects the luminance level of the digital imaged signal in a plurality of pixels within the first pixel region, and provides the obtained luminance information to the timing adjustment unit. The timing adjustment unit obtains the optimum phase for the phase of the pulse based on the received luminance information and instructs the setting of such optimum phase to the timing generator etc. The phase adjustment of the pulse based on such luminance information is suited, for example, for phase adjustment of a peak sample pulse for sampling the signal component that becomes a peak in the signal period or for phase adjustment of a reference sample pulse for sampling the signal component that becomes a reference in correlated double sampling. The variance calculation unit calculates the variance for the plurality of pixels within the second pixel region to be calculated with the variance indicating signal variation between pixels, and provides the obtained variance information to the timing adjustment unit. The timing adjustment unit adjusts the phase of the pulse based on the received variance information. The phase adjustment of the pulse based on such variance information is suited for phase adjustment of an AD clock signal that is an operation clock of when AD converting the analog imaged signal to the digital imaged signal. The above processes of phase adjustment are automatically performed by cooperation of the luminance level detecting unit, the variance calculating unit, and the timing adjustment unit. In the analog imaged signal obtained from the imaging element, the accuracy of phase adjustment of the pulse for driving the imaging element becomes high since the luminance level detecting unit actually measures the luminance, the variance calculating unit calculates the variance indicating signal variation between pixels, and the phase of the pulse is adjusted in view of the luminance and the variance. That is, phase adjustment that complies with the state of the current imaging element can be performed. Since each phase of the pulse for driving the imaging element is automatically adjusted, the time necessary for the adjustment process is reduced compared to the case where the technicians manually adjust the phase of the pulse.

In addition, the following effects are exhibited when the timing adjustment unit controls the imaging device so that the exposure state of the analog imaged signal is suited for the luminance level detection process by the luminance level detecting unit and the variance calculation process by the variance calculating unit. That is, the optimum phases of the reference sample pulse and the peak sample pulse are determined based on the luminance level. The optimum phase of the AD clock signal is determined based on the variance.

Variance is a value indicating the extent of variation of the signal level of each pixel which should be constant in a state of ideal condition in which the imaging element is light shielded. Therefore, the phase of the AD clock signal must be set so that the variance becomes small. The larger the subject exposure amount is, the detection of luminance level becomes more accurate. The smaller the subject exposure amount is, the calculation of variance becomes more accurate. Thus, the detection of the luminance level is desirably made at the bright section data where the exposure amount is large, and the calculation of variance is desirably made at the dark section data where the exposure amount is small. Therefore, for example, the timing adjustment unit of the present invention is configured to control the light emission pattern of the subject irradiating unit.

When detecting the luminance level of the digital imaged signal in the luminance level detecting unit, and calculating the optimum phases of the peak sample pulse and the reference sample pulse based on the luminance level in the timing adjustment unit, the timing adjustment unit controls the imaging device so that the exposure amount becomes large. When calculating the variance indicating signal variation between pixels of the digital imaged signal in the variance calculating unit, and calculating the optimum phase of the AD clock signal based on the variance in the timing adjustment unit, the timing adjustment unit controls the imaging device so that the exposure amount becomes small (ideally, the exposure amount is zero). The luminance level and the variance can be calculated at high accuracy by controlling the exposure amount in the imaging device. The optimum phases of the peak sample pulse, the reference sample pulse, and the AD clock signal are thereby set at high accuracy.

The present invention includes a mode in which the imaging device includes a subject irradiating unit for irradiating a photographing auxiliary light on a subject in photographing; and the timing adjustment unit adjusts the exposure state of the analog imaged signal by controlling a light emission pattern of the photographing auxiliary light by the subject irradiating unit.

The present invention includes a mode in which the timing adjustment unit controls the exposure state of the analog imaged signal so that bright section data for the luminance level detection and dark section data for the variance calculation are simultaneously acquired in one frame. According to such configuration, a plurality of exposure patterns is created in one frame, so that the bright section data for calculation of the luminance level and the dark section data for the calculation of the variance are simultaneously acquired from one image data, whereby the time required to acquire the data is reduced, and higher speed of phase adjustment is achieved. In such configuration, an MOS image sensor is used for the imaging element, and the line exposure of the MOS image sensor is desirably used.

The present invention includes a mode in which the imaging device includes a reset shift register for providing a reset pulse to each line and a reset mask control unit for controlling the provision of the reset pulse for every line; and the timing adjustment unit controls the reset mask control unit to simultaneously acquire the bright section data for the luminance level detection and the dark section data for the variance calculation in one frame. According to such configuration, acquisition of the bright section data of the line in which the exposure time is long and the dark section data of the line in which the exposure time is short within the same frame are easily realized, and the time for acquiring the data to be used in phase adjustment is greatly reduced. One frame includes a great number of odd lines and even lines. Thus, if the bright section data and the dark section data are respectively acquired in the odd line and the even line, there is a great number of opportunities to acquire the bright section data and the dark section data within one frame, whereby the accuracy of the luminance level and the variance becomes high.

The present invention includes a mode in which the imaging device includes a color filter of Bayer array; and the timing adjustment unit controls the reset mask control unit so that a final output signal of the imaging device is subjected to a masked/non-masked setting by the reset pulse in 2n line units (n is a positive integer). According to such configuration, response can be made with the image processing mode of nine pixel mixing.

The present invention includes a mode in which the imaging device includes a vertical shift register; and the timing adjustment unit arbitrarily adjusts a shift speed of the vertical shift register. In such configuration, a switch between normal read-out and high speed read-out is made on the shift operation of the vertical shift register, where only the data of the pixel portion necessary for phase adjustment is read out in normal read-out, and the other data is read out at high speed and then discarded. Therefore, the effective perpendicular period is reduced, and higher speed of phase adjustment is achieved.

The present invention includes a mode in which a read-out selecting unit for selecting an arbitrary one portion of a frame in the digital imaged signal is further arranged; wherein the timing adjustment unit normally reads out the one portion selected by the read-out selecting unit and uses the one portion in phase adjustment. In a configuration of acquiring the bright section data and the dark section data using the data for one frame, the time for acquiring the data becomes enormous in the case of the imaging element having high pixels in which the number of pixels is sufficiently large. Thus, limiting to one portion by the read-out selecting unit, the dark section data and the bright section data are acquired in the relevant one portion and used for phase adjustment. Thus, the time for acquiring the data is reduced, and higher speed of phase adjustment is achieved.

The present invention includes a mode in which a defective pixel detecting unit for detecting a defective pixel in the imaging device is further arranged; wherein the read-out selecting unit selects the one portion without including the defective pixel detected by the defective pixel detecting unit. In the defective pixel, the signal level is fixed near a maximum value or a minimum value irrespective of the light quantity of the incident light. Therefore, the defective pixel is detected in the defective pixel detecting unit, and the read-out selecting unit performs a control so as not to select the defective pixel, whereby the use of the defective pixel in the phase adjustment is prevented beforehand, and the accuracy of the phase adjustment is enhanced.

A digital camera of the present invention relates to a digital camera including an imaging device; and the phase adjusting device of the present invention for giving a phase adjustment instruction of the pulse used by the imaging device in imaging; wherein the imaging device includes a timing generator for generating the pulse, an imaging element for generating an analog imaged signal based on the pulse, a correlated double sampling unit for performing correlated double sampling on the analog imaged signal and determining a signal level for every pixel, an automatic gain controller for adjusting an amplitude of an imaged signal output from the correlated double sampling unit, and an A/D converter for converting an imaged signal output from the automatic gain controller to a digital value.

The imaging element, the correlated double sampling unit, the automatic gain controller, the A/D converter, and the timing generator, which are the components described above, are general components of a digital camera and thus will not be particularly described. However, it should be noted that the digital camera is equipped with the phase adjusting device of the present invention.

The digital camera of the present invention includes a mode in which timing adjustment unit controls the exposure state of the imaging element so that bright section data for the luminance level detection and dark section data for the variance calculation are simultaneously acquired in one frame.

The digital camera of the present invention includes a mode in which the imaging device includes a subject irradiating unit for irradiating a photographing auxiliary light on a subject in photographing; and the timing adjustment unit adjusts the exposure state of the analog imaged signal by controlling a light emission pattern of the photographing auxiliary light by the subject irradiating unit.

The digital camera of the present invention includes a mode in which the imaging device includes a reset shift register for providing a reset pulse to each line and a reset mask control unit for controlling the provision of the reset pulse for every line; and the timing adjustment unit controls the reset mask control unit to simultaneously acquire the bright section data for the luminance level detection and the dark section data for the variance calculation in one frame.

The digital camera of the present invention includes a mode in which the imaging element includes a reset shift register for providing a reset pulse to each line and a reset mask control unit for controlling the provision of the reset pulse for every line; the timing adjustment unit controls the reset mask control unit to simultaneously acquire the bright section data for the luminance level detection and the dark section data for the variance calculation in one frame; and the automatic gain controller switches gains between the bright section data and the dark section data. According to such configuration, different gains can be applied on the bright section data and the dark section data, where a large gain is applied on the dark section data so that the detection accuracy of the variance becomes high.

The digital camera of the present invention further includes a mode in which a display unit for displaying the digital imaged signal is further arranged; wherein the automatic gain controller adjusts at least one of a gain of the dark section data or a gain of the bright section data so that an output level of the dark section data and an output level of the bright section data become equal when the display unit is displaying the digital imaged signal.

If the bright section data and the dark section data exist in one frame, a luminance difference is created between the bright section data and the dark section data when the image is displayed during phase adjustment. In such case, an appropriate gain is respectively applied to the bright section data and the dark section data in the gain switching control unit, so that the level of the output data after gain adjustment becomes constant, and an image without luminance difference is displayed on the display unit even during phase adjustment.

According to the present invention, the luminance is actually measured in the analog imaged signal obtained from the imaging element, and the phase of the pulse is adjusted based thereon, so that phase adjustment complying with the state of the current imaging element can be performed and high accuracy of pulse phase adjustment is achieved. Furthermore, since each phase of the pulse is automatically adjusted, the time necessary for the adjustment process can be reduced compared to the case where the technicians manually perform the adjustment. In terms of speed as well, since the bright section data for detecting the luminance level and the dark section data for calculating the variance are acquired from one frame image data, the luminance level and the variance of high accuracy can be calculated, and the optimum phase of each pulse (peak sample pulse, reference sample pulse, AD clock signal etc.) can be set at high accuracy. Furthermore, the time for acquiring the data can be reduced and higher speed of the phase adjustment process can be achieved. This is particularly effective in the field where real-time performance is extremely important such as in-vehicle digital camera.

According to the present invention, the timing adjustment of the pulse to be used in imaging in the digital camera can be automatically performed, and thus has usability at least in digital cameras. In particular, since the time for acquiring the data can be reduced and higher speed can be achieved, the present invention is particularly effective in the field where real-time performance is extremely important such as in-vehicle digital camera.

BRIEF DESCRIPTION OF THE DRAWINGS

Other objects of the present invention will be clear by understanding embodiments as will be described below and specified in the appended claims. Implementation of the present invention reminds the person in the art of many advantages which are not described in this specification.

FIG. 2 is a view showing a signal component output from an imaging element;

FIG. 3A is a flowchart showing an overall operation of the phase adjustment in the embodiment of the present invention;

FIG. 3B is a view showing adjustment progress at the set value of each pulse in time of adjustment;

FIG. 8 is a view showing a relationship of a repeating unit of a color filter and the setting of masked/non-masked state of the reset pulse when the imaging element including a color filter of Bayer array is used in the second embodiment of the present invention;

DETAILED DESCRIPTION OF THE PREFERRED EMBODIMENTS

The embodiment of a digital camera mounted with a phase adjusting device according to the present invention will now be described in detail with reference to the drawings.

First Embodiment

Figure 1:
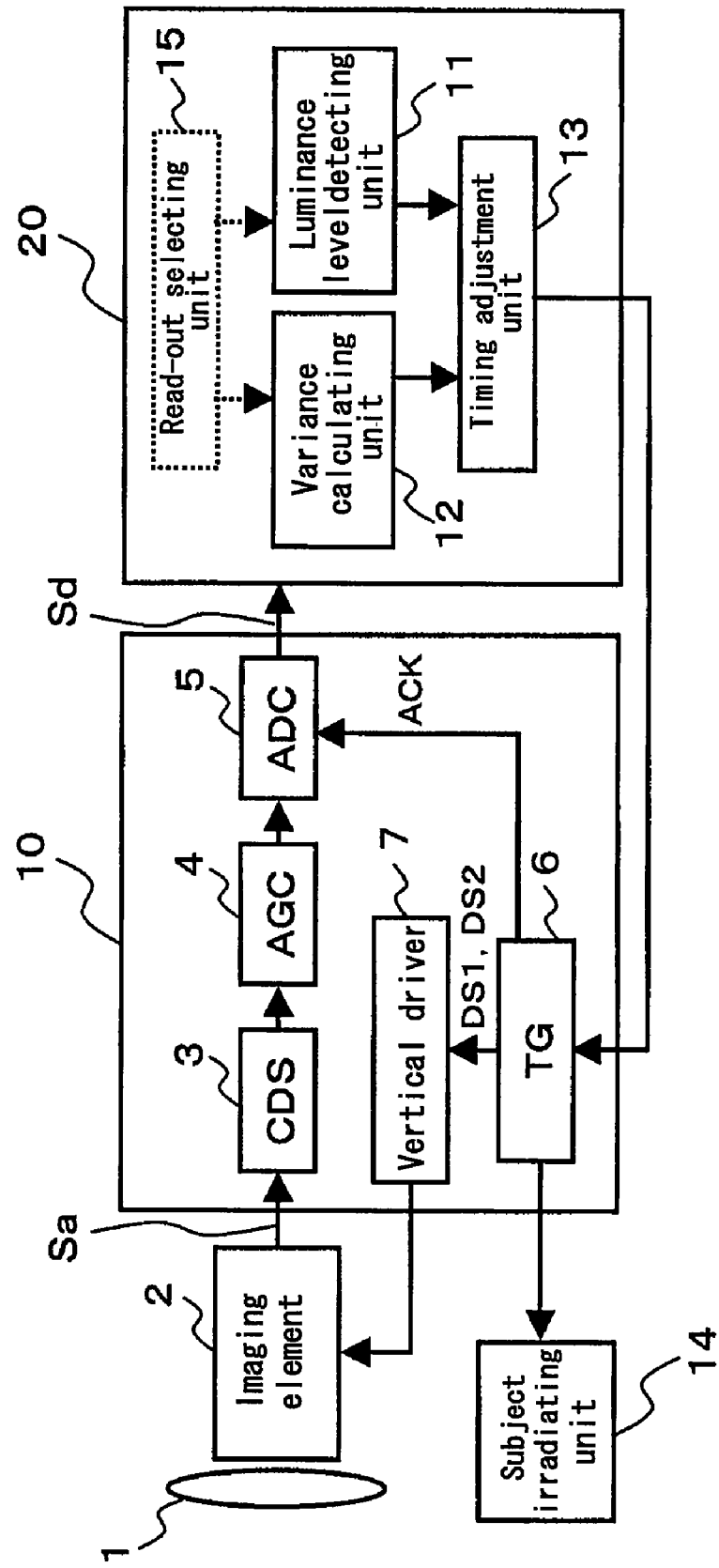
FIG. 1 is a block diagram showing an overall configuration of a digital camera according to a first embodiment of the present invention.

FIG. 1 is a block diagram showing an overall configuration of a digital camera according to a first embodiment of the present invention. The digital camera of the present embodiment includes an optical lens 1 for collecting the subject image on an imaging element 2, the imaging element 2 (MOS image sensor) for imaging the subject image collected by the optical lens 1, an analog front end 10 for performing a predetermined process on an analog imaged signal Sa output from the imaging element 2 to convert the same to a digital imaged signal Sd, and a DSP (Digital Signal Processor) 20 for performing a predetermined process (color correction, YC process, etc.) on the digital imaged signal Sd output from the analog front end 10 and generating an image signal. The DSP 20 configures the phase adjusting device in the present embodiment.

The imaging element 2 includes a plurality of pixels, which plurality of pixels includes an effective pixel region used for imaging the subject and an OB (Optical Black) pixel region arranged in a light shielded state at the periphery of the effective pixel region and used for detection of an OB level.

The analog front end 10 includes a correlated double sampling (CDS) unit 3 for performing correlated double sampling to determine the signal level of an analog imaged signal Sa output from the imaging element 2, an automatic gain controller (AGC) 4 for amplifying the signal output from the correlated double sampling unit 3 with an adjustable gain, an AD converter (Analog Digital Converter) 5 for converting the signal amplified by the automatic gain controller 4 to a digital imaged signal Sd, a timing generator (TG) 6 for generating a pulse to be used for imaging, and a vertical driver 7 for outputting the pulse generated by the timing generator 6 to the imaging element 2.

The DSP 20 includes a luminance level detecting unit 11 for detecting the level of luminance by calculating an average value of the signal levels of the pixels selected within a predetermine region, a variance calculating unit 12 for calculating a variance in the signal level between the selected pixels, and a timing adjustment unit 13 for performing phase (timing) adjustment of a reference sample pulse DS1, a peak sample pulse DS2, and an AD clock signal ACK to be generated by the timing generator 6 based on the detection/calculation results of the luminance level detecting unit 11 and the variance calculating unit 12. Reference numeral 14 is a subject irradiating unit for performing pulse light emission based on the pulse controlled by the timing generator 6. In the present embodiment, the optical lens 1, the imaging element 2, the subject irradiating unit 14, and the analog front end 10 configure an imaging device.

FIG. 2 is a view showing the analog imaged signal Sa output from the imaging element 2 in time series. As shown in FIG. 2, the analog imaged signal Sa is configured by a reference period T1 and an a signal period T2.

The reference period T1 is a period in which the reference voltage is output from the imaging element 2, and is a period for detecting the signal that becomes a reference when the correlated double sampling unit 3 operates. The signal period T2 is a period in which the signal voltage is output, where the signal voltage that becomes a peak in the signal period T2 and the reference voltage in the reference period T1 are sampled, and the difference between the sampled voltages is taken to obtain the signal level Vs of the analog imaged signal Sa. In FIG. 2, the downward direction in the figure is defined as the direction the signal component is positive.

FIG. 3A shows an overall flow of the phase adjustment of each pulse in the present embodiment, and FIG. 3B shows adjustment progress at the set value of each pulse in time of adjustment. The phase adjustment process is mainly performed by the luminance level detecting unit 11, the variance calculating unit 12, and the timing adjustment unit 13.

In the present embodiment, the reference sample pulse DS1, the peak sample pulse DS2, and the AD clock signal ACK are the pulses to be adjusted. The reference sample pulse DS1 is a pulse for sampling the signal component that becomes a reference in correlated double sampling. Therefore, the phase adjustment is desirably performed so that the rising edge appears at the center of the reference period. The peak sample pulse DS2 is a pulse for sampling the signal component that becomes a peak in the signal period T2. Therefore, the phase adjustment is desirably performed so that the rising edge appears when the signal component (analog imaged signal) output from the imaging element 2 becomes the peak. The signal level Vs calculated by the correlated double sampling unit 3 is merely the difference between the signal component of the peak at the rise of the peak sample pulse DS2 and the signal component within the reference period defined by the rise of the reference sample pulse DS1. The AD clock signal ACK is a clock signal for the operation of the AD converter 5, where the phase adjustment is desirably performed so that the result of AD conversion does not vary.

In the present embodiment, the data (characteristic data of a digital image signal) necessary for determining the phase of the peak sample pulse DS2 is first measured while shifting the phase of the peak sample pulse DS2 from an initial value with the phases of the reference sample pulse DS1 and the AD clock signal ACK fixed at the respective initial value defined in advance (step S1).

The data is evaluated to determine an optimum phase for the peak sample pulse DS2 (step S2). After the phase of the peak sample pulse DS2 is determined, data (characteristics of the digital image signal) necessary for determining the phase of the reference sample pulse DS1 is measured while shifting the phase of the reference sample pulse DS1 from the initial value with the phase of the peak sample pulse DS2 fixed at the determined optimum value and the phase of the AD clock signal ACK fixed at the initial value (step S3).

The data is evaluated to determine an optimum phase for the reference sample pulse DS1 (step S4). After the phases of the reference sample pulse DS1 and the peak sample pulse DS2 are determined, data (characteristics of the digital image signal) necessary for determining the phase of the AD clock signal ACK is measured while shifting the phase of the AD clock signal ACK from the initial value with the phases of the reference sample pulse DS1 and the peak sample pulse DS2 fixed at the respective optimum values (step S5). The data is evaluated to determine an optimum phase for the AD clock signal ACK (step S6).

After the optimum phases of the reference sample pulse DS1, the peak sample pulse DS2, and the AD clock signal ACK are determined, information related to the determined optimum phases are set in the register of the timing generator 6 (step S7). The pulses are thereby generated at the optimum phase.

Figure 4:
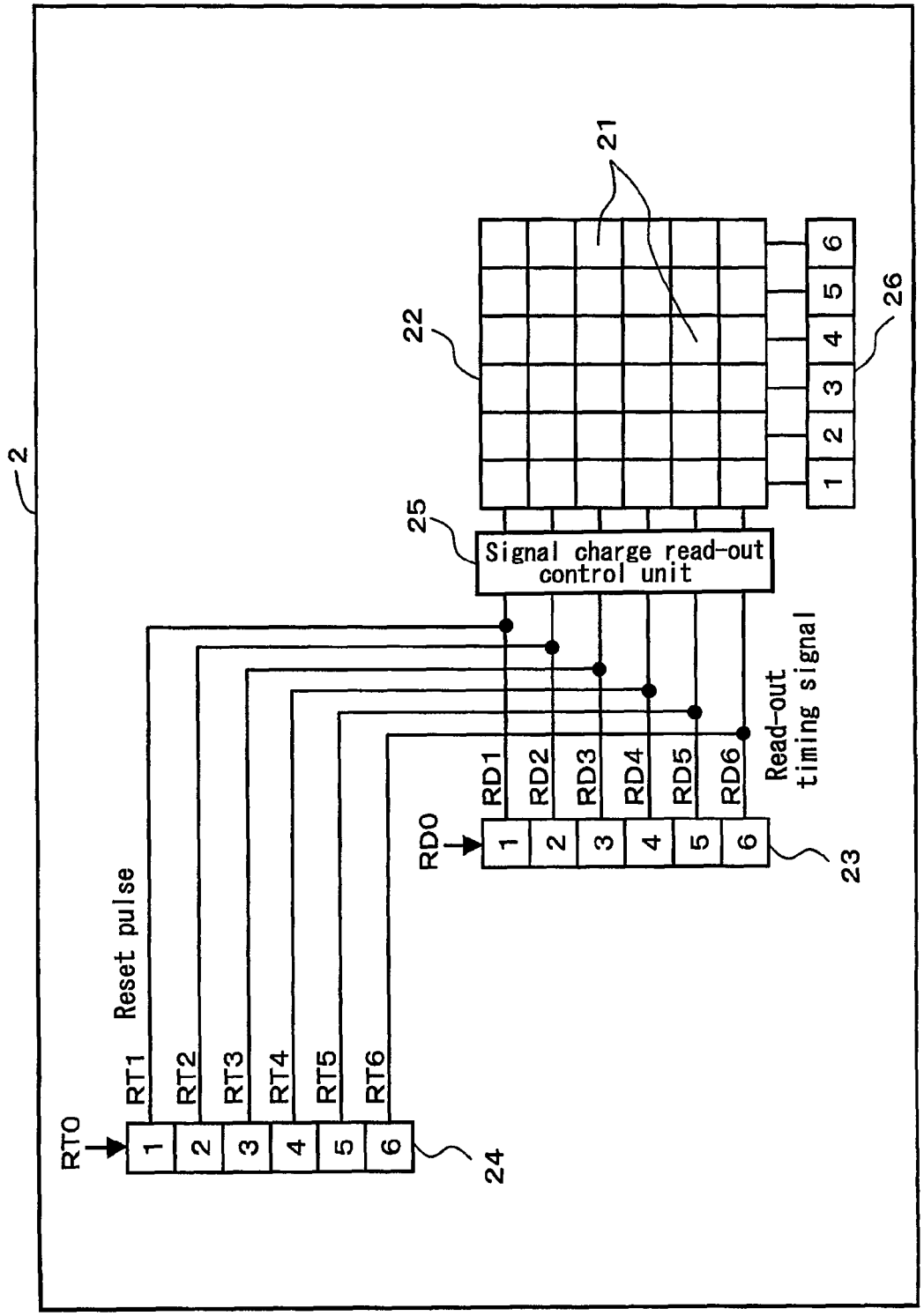
FIG. 4 is a view showing a configuration of the imaging element in the first embodiment of the present invention.

FIG. 4 shows a configuration of the imaging element (MOS image sensor) 2. The imaging element 2 includes an area sensor 22, a signal charge read-out control unit 25, a vertical shift register 23, a reset shift register 24, and a horizontal shift register 26.

The area sensor 22 has a plurality of photoelectric conversion elements 21 for outputting a pixel signal arranged in a matrix form. If a reset pulse RTi is input, the signal charge read-out control unit 25 reads out the signal charge stored in the photoelectric conversion element 21 from the area sensor 22 in line units during an exposure time from the reset pulse RTi to a read-out timing signal RDi. If the reset pulse RTi is not input, the signal charge read-out control unit 25 reads out the signal charge stored in the photoelectric conversion element 21 from the area sensor 22 in line units during the exposure time from the read-out timing signal RDi to the read-out timing signal RDi of the next cycle. The vertical shift register 23 sequentially outputs the read-out timing signal RDi to the signal charge read-out control unit 25 in line units. The reset shift register 24 sequentially outputs the reset pulse RTi to the signal charge read-out control unit 25 in line units. The horizontal shift register 26 transfers the signal charge transferred from the photoelectric conversion element 21 of the area sensor 22 by the signal charge read-out control unit 25 one pixel at a time in the horizontal direction, and sends the same to an output amplifier for converting to a voltage signal (not shown).

Figure 5:
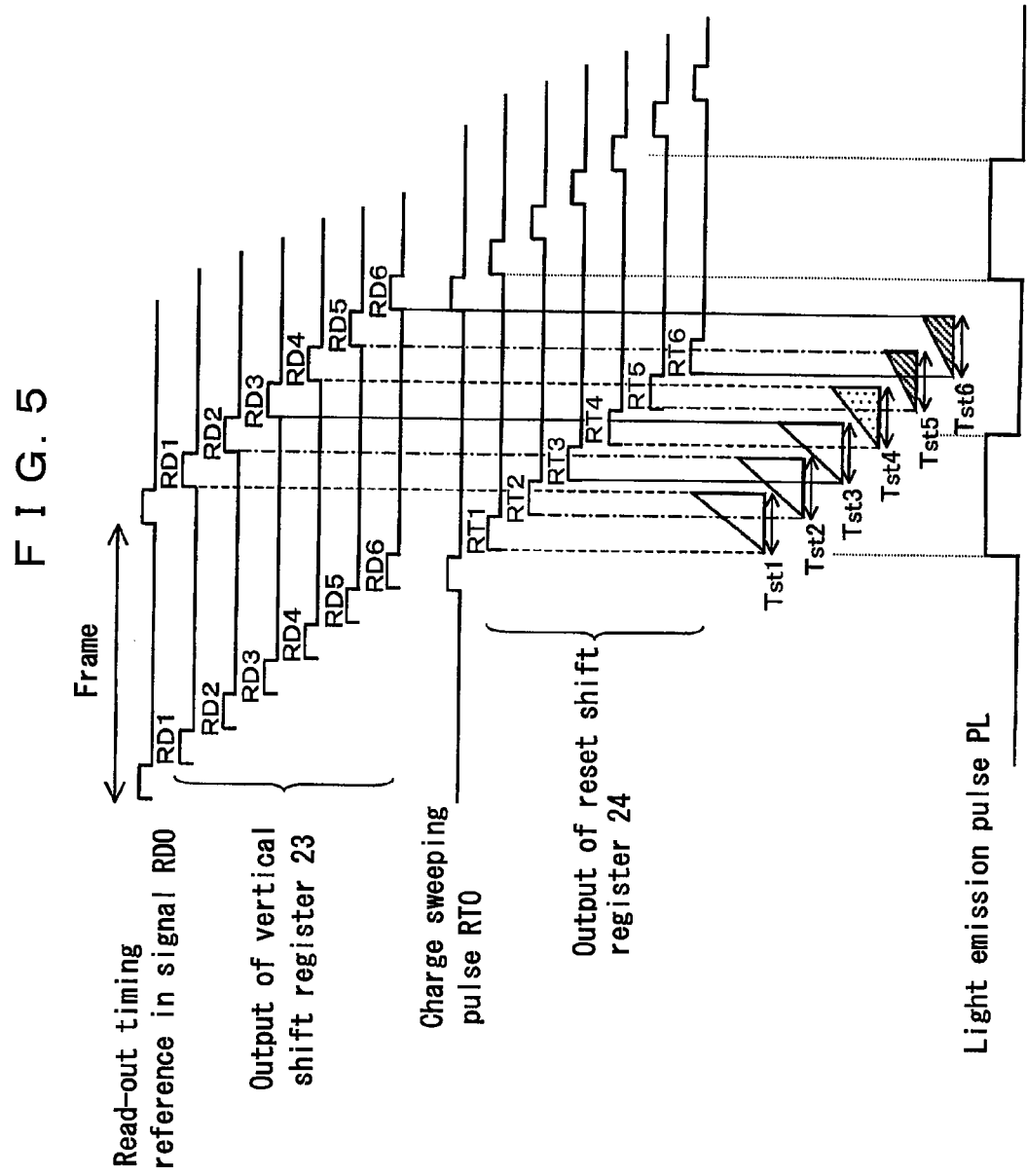
FIG. 5 is a view showing the exposure of the imaging element when a subject irradiating unit is pulse light emitted in the first embodiment of the present invention.

The operation of the imaging element 2 will now be described with reference to FIG. 5. A read-out timing reference signal RD0 for generating a read-out reference timing of the signal charge of the imaging element 2 is input to the vertical shift register 23, and the read-out timing signals RD1, RD2, RD3, . . . , of each line are generated while sequentially shifting. The read-out of the first line will be described in detail. Due to the rise of the previous first read-out timing signal RD1, the stored signal charges are reset and the storing of the signal charges is restarted in the photoelectric conversion element (pixel) 21 group of the first line. The first reset pulse RT1 rises before the first read-out timing signal RD1 of the next cycle rises, where the stored signal charges up to the relevant point are reset and the storing of the signal charges is restarted. The stored signal charges during the this time are discarded.

The first read-out timing signal RD1 of the next cycle rises after the rise of the first reset pulse RT1. This is indicated with a triangle in FIG. 5. The horizontal axis of the triangle represents time, and the vertical axis represents exposure amount. The exposure time of the exposure state indicated by the triangle of the first line is Tst1. The length of the exposure time Tst1 is determined depending on which timing to raise the first reset pulse RT1.

A case of using an LED (Light Emitting Diode) for the subject irradiating unit 14 will be described. As shown in FIG. 5, when the LED is light emitted in the frame as indicated with a light emission pulse PL, bright section data can be acquired at the line the LED 14 is emitting light during the exposure and dark section data can be acquired at the line the LED 14 is turned OFF during the exposure, whereby the bright section data and the dark section data can be acquired in one frame. Therefore, compared to the configuration of acquiring one type of data in one frame, the time for acquiring the data to be used in phase adjustment can be greatly reduced. The line at where the light emission state of the LED 14 is switched is produced, but the data for such line is not used in the phase adjustment.

When detecting the luminance level of the digital imaged signal Sd by the luminance level detecting unit 11 and calculating the optimum phases of the peak sample pulse DS2 and the reference sample pulse DS1 based on the luminance level in the timing adjustment unit 13, the timing adjustment unit 13 controls the light emission pattern of the subject irradiating unit 14 so that the exposure amount becomes large. When calculating the variance indicating signal variation between pixels of the digital imaged signal Sd by the variance calculating unit 12 and calculating the optimum phase of the AD clock signal ACK based on the variance in the timing adjustment unit 13, the timing adjustment unit 13 controls the light emission pattern of the subject irradiating unit 14 so that the exposure amount becomes zero (no light emission).

The luminance level in the bright section data acquired at the timing of light emission pulse PL is used to determine the optimum phases of the reference sample pulse DS1 and the peak sample pulse DS2. The variance in the dark section data acquired at the timing other than at the timing of the light emission pulse PL is used to determine the optimum phase of the AD clock signal ACK.

According to the present embodiment, each phase of the peak sample pulse DS2, the reference sample pulse DS1, and the AD clock signal ACK output from the timing generator 6 can be automatically adjusted when the imaging element 2 itself is replaced or when the characteristics of the imaging element 2 are changed due to external factors (temperature, voltage change, and the like) and aging degradation. Furthermore, the luminance level and the variance of high accuracy can be calculated and the optimum phases of each pulse/signal can be set at high accuracy by controlling the light emission pattern of the subject irradiating unit 14.

Second Embodiment

Figure 6:
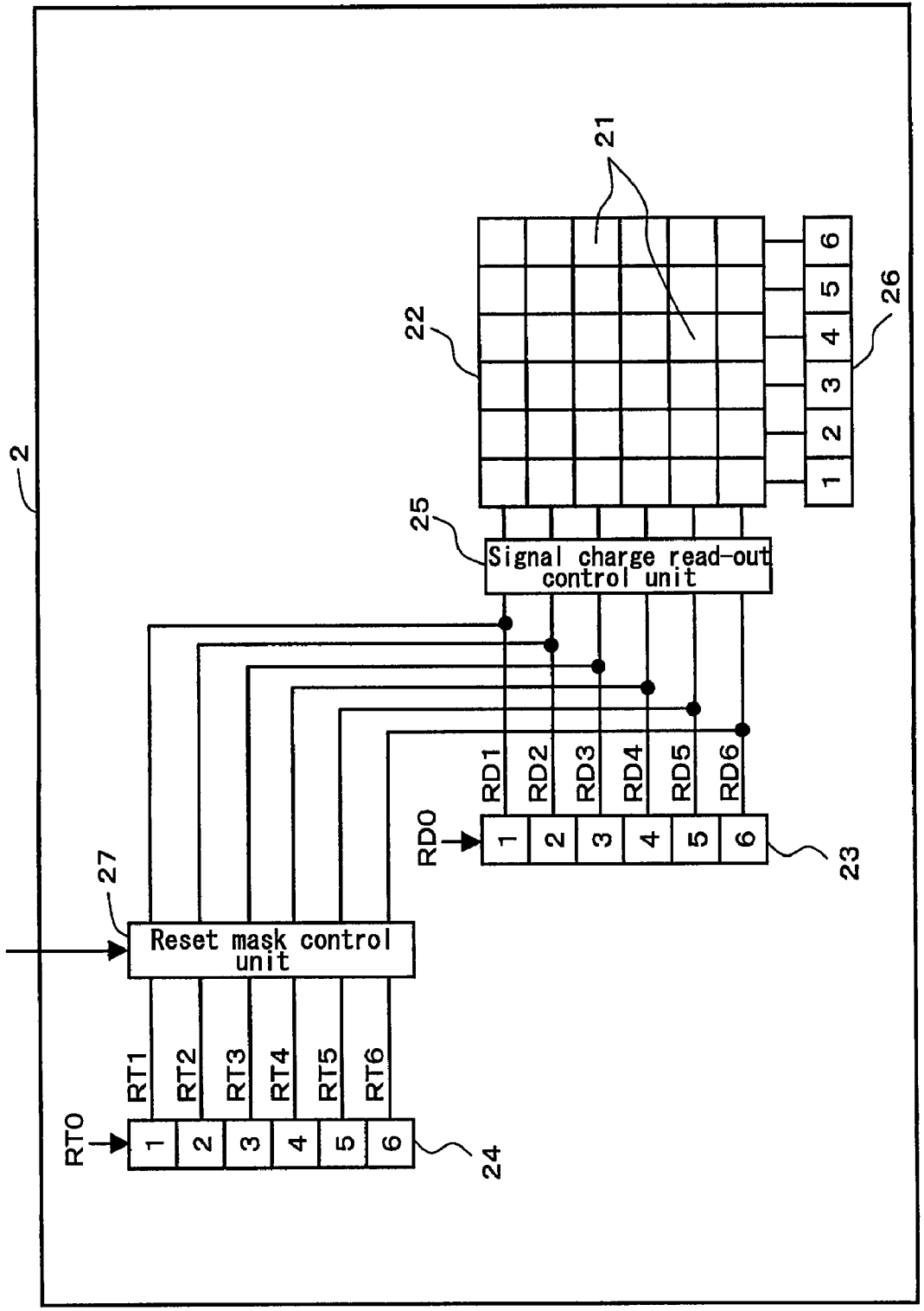
FIG. 6 is a view showing an imaging element including a reset mask control unit according to a second embodiment of the present invention.

FIG. 6 shows a configuration of the imaging element 2 in the digital camera according to a second embodiment of the present invention. In FIG. 6, same reference numerals as in FIG. 4 of the first embodiment are denoted for the same components. Reference numeral 27 is a reset mask control unit. The reset mask control unit 27 is interposed between the reset shift register 24 and the signal charge read-out control unit 25, and is arranged to set a state of permitting the transmission and a state of prohibiting the transmission of the reset pulse RTi to the signal charge read-out control unit 25 in line units.

Figure 7:
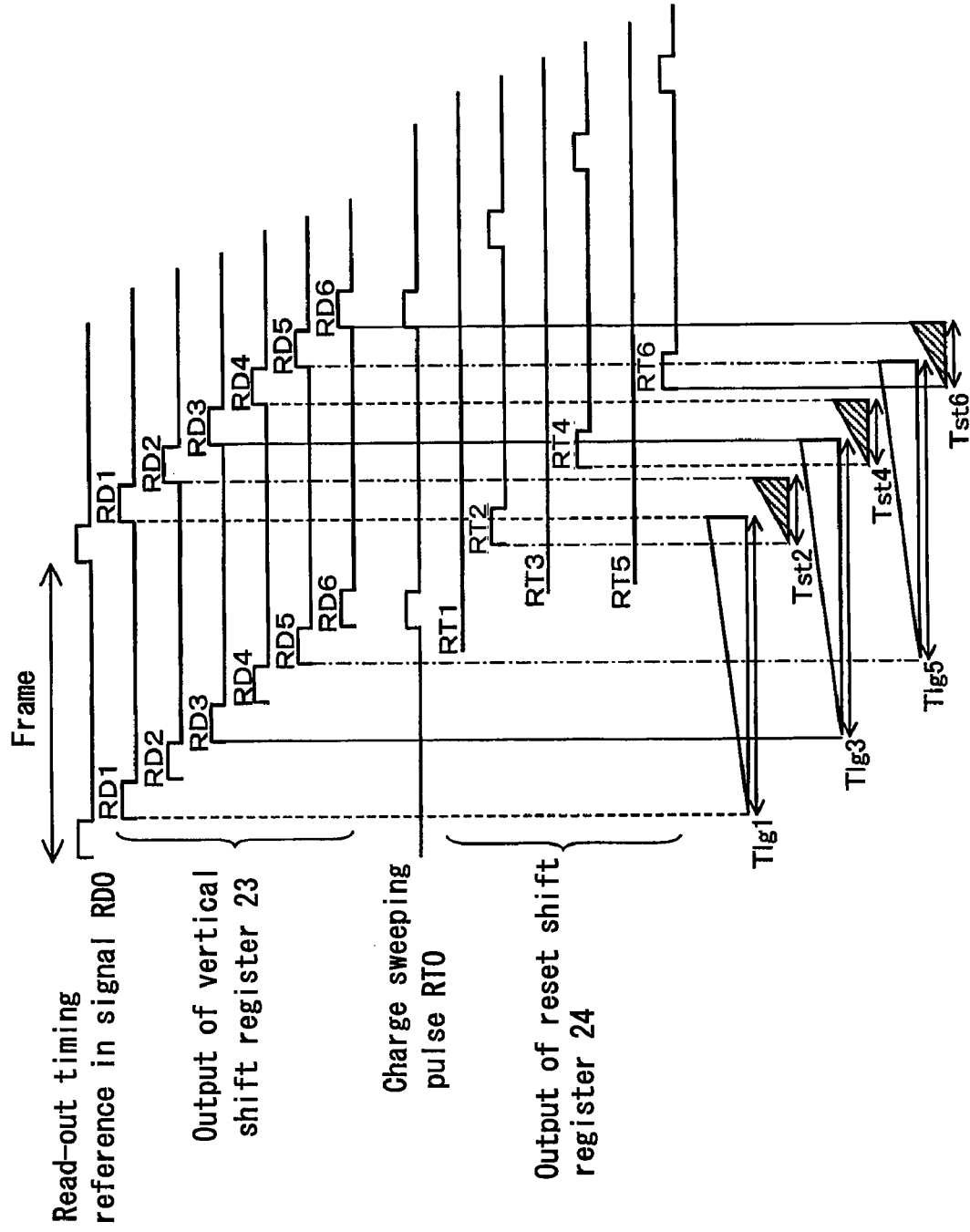
FIG. 7 is a view showing the exposure when the reset pulse is set to masked/non-masked in the second embodiment of the present invention.

The difference in exposure time when the reset pulse of the vertical shift register 23 is set to masked/non-masked will now be described with reference to FIG. 7. The odd lines are set to be masked and the even lines are set to be non-masked. The exposure time (T1g1, T1g3, T1g5 . . . ) of the odd lines in which the reset pulse RTi (i=1, 2 . . . ) is masked by the reset mask control unit 27 is equal to the period of one frame. The exposure time of the even lines in which the reset pulse is non-masked is the time from the rise of the reset pulse RTi to the rise of the read-out timing signal RDi (i=1, 2, . . . ), as described in the first embodiment. Thus, a plurality of exposure times can be set within the same frame. Through the use of such imaging element 2, the bright section data (line of long exposure time) and the dark section data (line of short exposure time) can be acquired within the same frame, and the time for acquiring the data to be used in phase adjustment can be greatly reduced compared to the case where one type of data is acquired in one frame.

Figure 9:
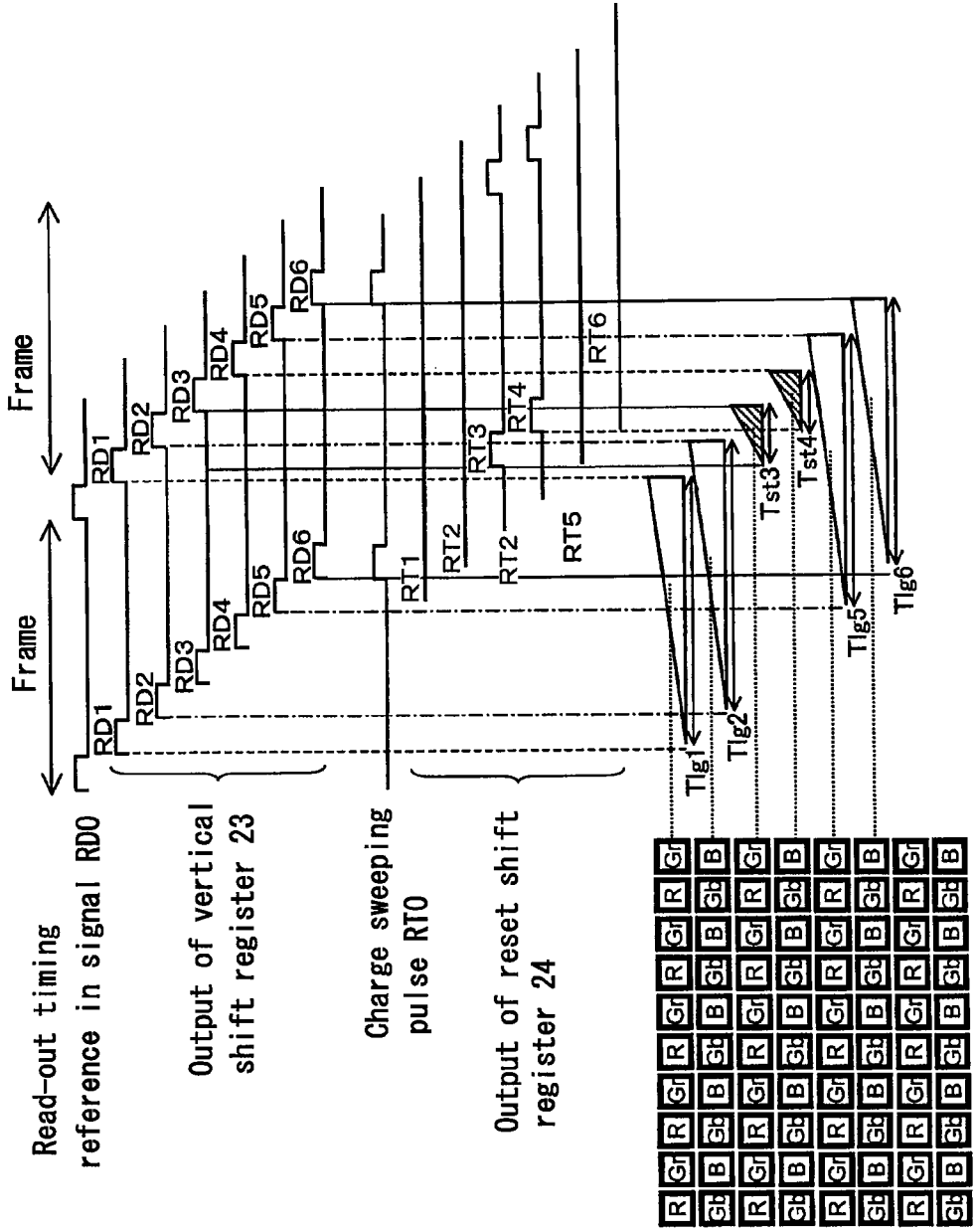
FIG. 9 is a view showing the exposure when the reset pulse is set to masked/non-masked in 2n line units in the second embodiment of the present invention.

When a color filter of Bayer array shown in FIG. 8 is used for the imaging element 2, a luminance signal Y is calculated as Y=0.59G+0.3R+0.11B. Thus, with the adjacent R pixel, Gr pixel, Gb pixel, and B pixel as a repeating unit U of the color filter, the setting of masked/non-masked state can be performed in 2n line units (n=1, 2, 3, . . . ) so that the pixels in the repeating unit U of the color filter have the same reset pulse mask setting. FIG. 9 shows the reset pulse mask setting of when n=1.

When pixel mixing is performed in the imaging element 2, the setting of masked/non-masked state of the reset pulse may be performed so that the output of the repeating unit U of the color filter is generated from the pixels of the same reset pulse mask setting at the final output after pixel mixing. A case of nine-pixel mixing will be described below by way of example.

Figure 10:
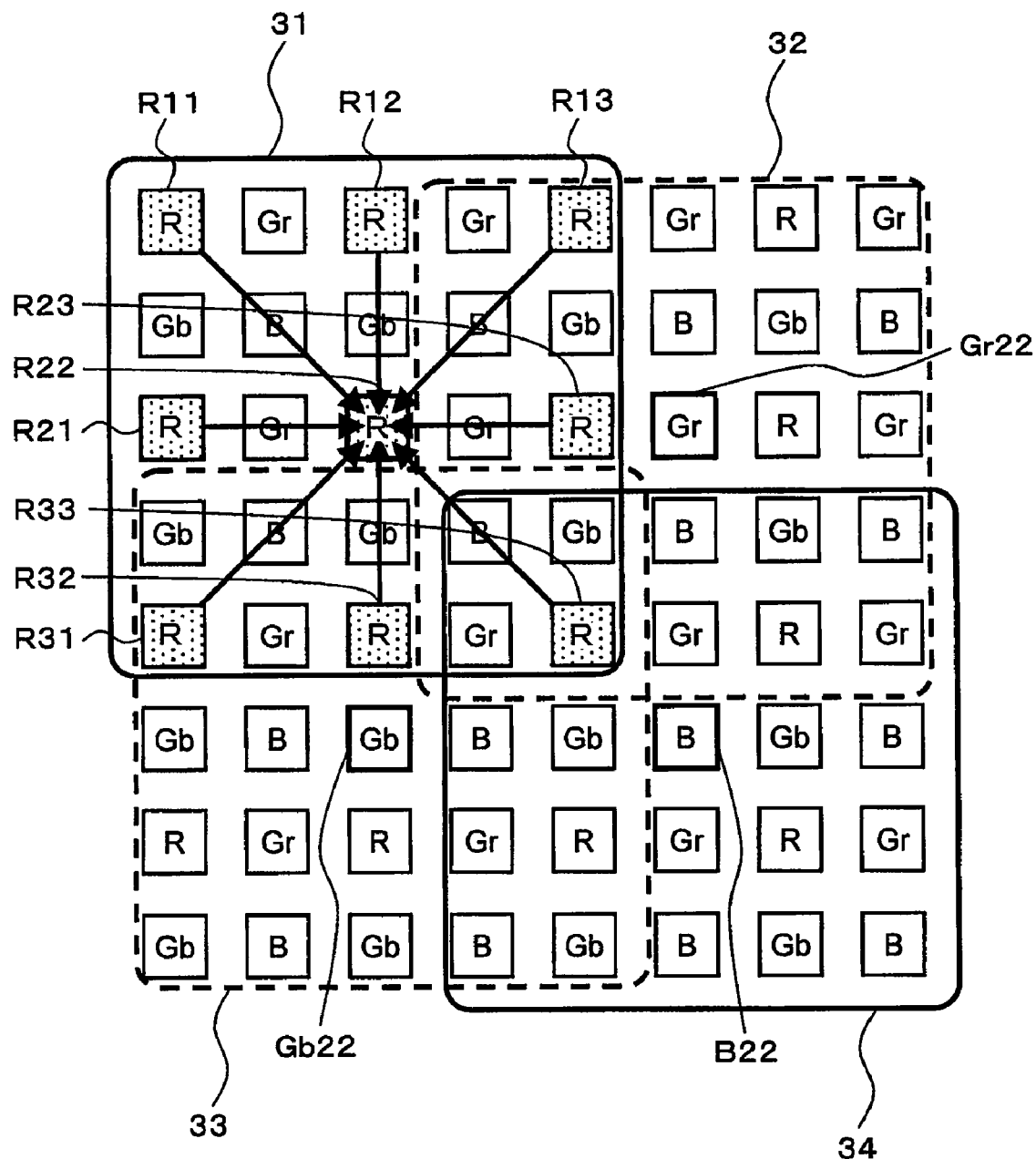
FIG. 10 is a view showing a mixed pixel of a nine-pixel mixing in an imaging device including the color filter of Bayer array in the second embodiment of the present invention.
Figure 11:
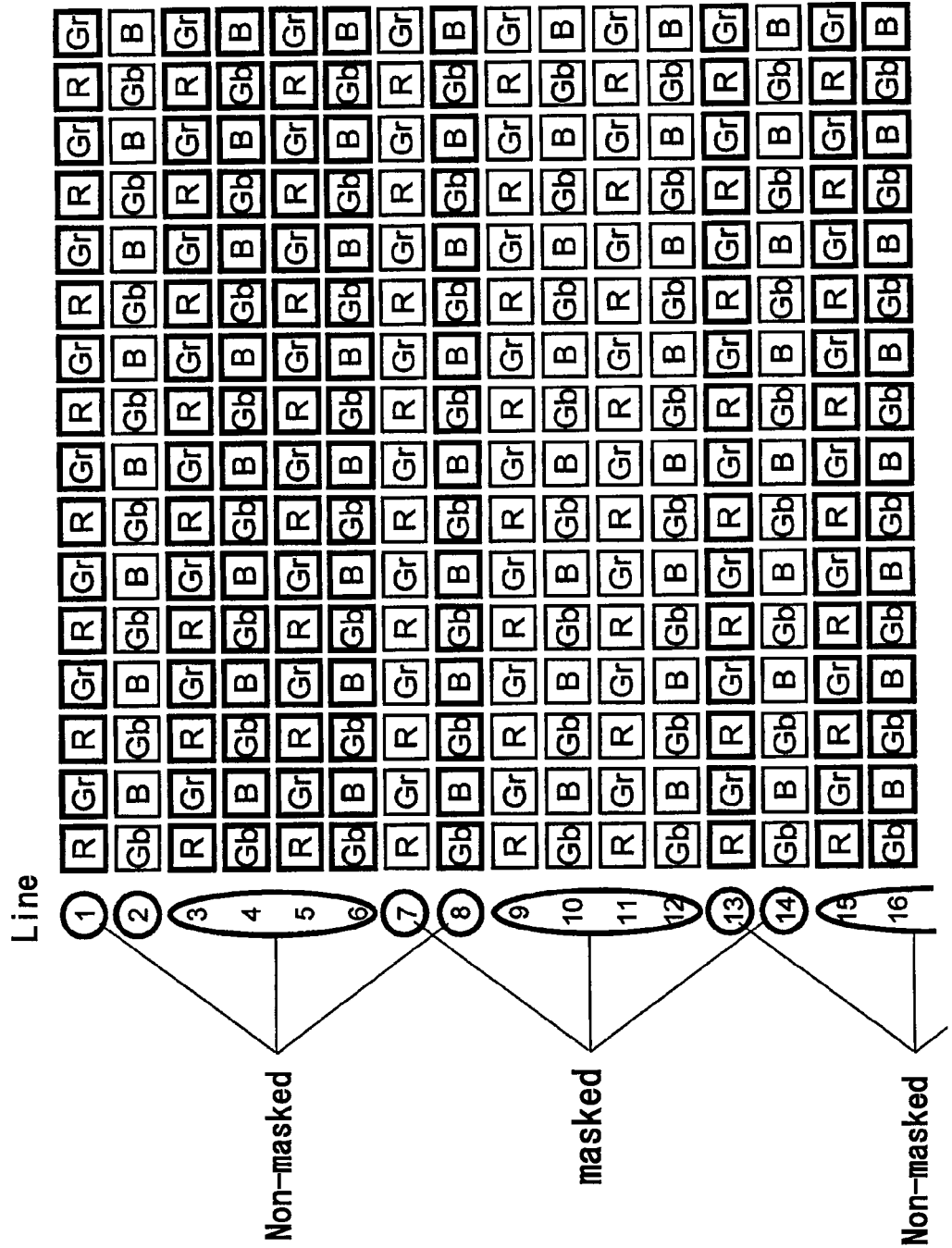
FIG. 11 is an example of a setting of masked/non-masked state of the reset pulse in the nine-pixel mixing in the second embodiment of the present invention.

FIG. 10 shows a pixel mixing region in nine-pixel mixing. Each pixel mixing region is arranged two-dimensionally so that each pixel mixing unit sequentially overlaps when shifted in the row direction by three pixels and also shifted in the column direction by three pixels. R pixel mixing region 31 includes pixels R11, R12, R13, R21, R22, R23, R31, R32, R33 having a color filter (R), where the signal of the pixel R22 positioned at the center of the R pixel mixing region 31 and the signals of eights pixels positioned around the pixel R22 are mixed to output a mixed pixel signal R. Similarly, in Gr pixel mixing region 32, Gb pixel mixing region 33, and B pixel mixing region 34, the signal of the pixel positioned at the center of the pixel mixing region and the signals of eights pixels positioned around the relevant pixel are mixed to output a mixed pixel signal Gr22, Gb22, and B22. The final output of the imaging element 2 after pixel mixing has the pixel mixing signal arrayed similar to the Bayer array before mixing. FIG. 11 shows a reset pulse mask setting in the nine-pixel mixing.

Third Embodiment

Figure 12:
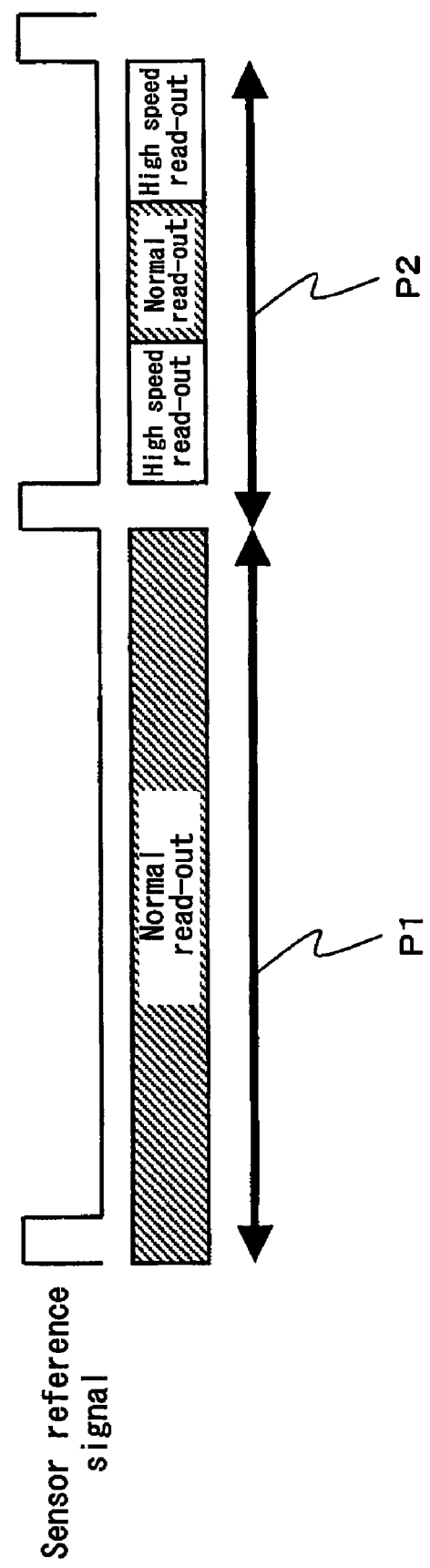
FIG. 12 is a view showing reduction in vertical period and performance of high speed adjustment by reading out data not necessary for phase adjustment at high speed according to a third embodiment of the present invention.

The data for one frame is not necessarily required for phase adjustment. When using the imaging element of high pixel in which the number of pixels is sufficiently large, only the data of the portion necessary for phase adjustment is read out, and the other data are read out at high speed, as shown in FIG. 12. High speed read-out means reading and discarding the data by shift operating the vertical shift register 23 at high speed. In the present embodiment, a read-out selecting unit 15 is further arranged in the DSP 20 in the configuration of the first embodiment as shown with a dotted line in FIG. 1. The read-out selecting unit 15 selects one arbitrary portion of the frame of the digital imaged signal Sd, and normally reads out the selected one arbitrary portion of the digital imaged signal Sd to use for phase adjustment. The vertical period in normal read-out is P1. In phase adjustment, only the data necessary for phase adjustment is read out through normal reading, and the other data are read and discarded through high speed read-out, so that the vertical period can be reduced as shown by P2, and higher speed of phase adjustment can be realized. The present embodiment is established irrespective of the first embodiment (light emission pattern control) or the second embodiment (reset pulse mask control).

Figure 13:
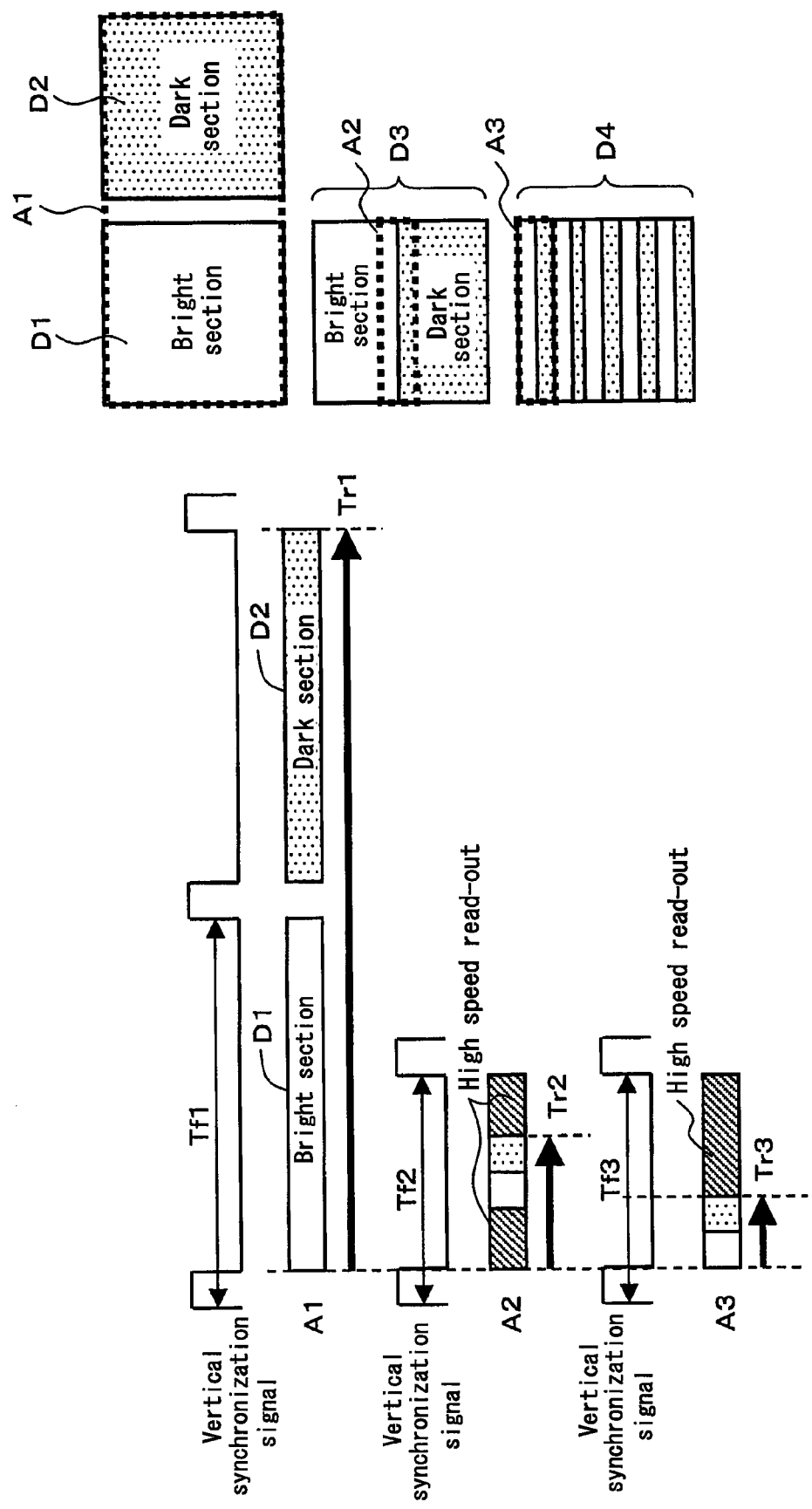
FIG. 13 is a view showing a difference in vertical period and read-out time due to difference in exposure method and read-out range in the third embodiment of the present invention.

FIG. 13 shows the vertical period and the read-out time due to the difference in exposure method and the read-out range. When performing phase adjustment using the data for one frame in time of normal exposure, the bright section data D1 and the dark section data D2 are required, and the data of a read-out range A1 must be read out. The vertical period in this case becomes Tf1, and time Tr1 is required to read out the read-out range A1.

When performing phase adjustment using a central part of the data D3 exposed by the phase adjusting device of the first embodiment, the vertical period becomes Tf2 and the read-out time of a read-out range A2 becomes Tr2.

When performing phase adjustment using the upper part of the data D4 exposed by the phase adjusting device of the second embodiment, the vertical period becomes Tf3 and the read-out time of a read-out range A3 becomes Tr3. When the same imaging element 2 is used, the vertical periods Tf2 and Tf3 become the same if the sizes of the read-out range A2 and A3 are the same. However, the read-out of the data can be terminated faster by applying the method disclosed in the second embodiment to the present embodiment, and thus the calculation can be started earlier. This is because the period for high speed read-out must be provided before the normal read-out in the former (first embodiment) case, whereas high speed read-out is not performed and normal read-out is immediately performed in the latter (second embodiment) case. Therefore, according to the present embodiment, the adjustment time can be greatly reduced by combining the configuration of the present embodiment of reading out only the data necessary for phase adjustment and performing phase adjustment to the phase adjusting device of the first embodiment or the second embodiment.

Fourth Embodiment

Figure 14:
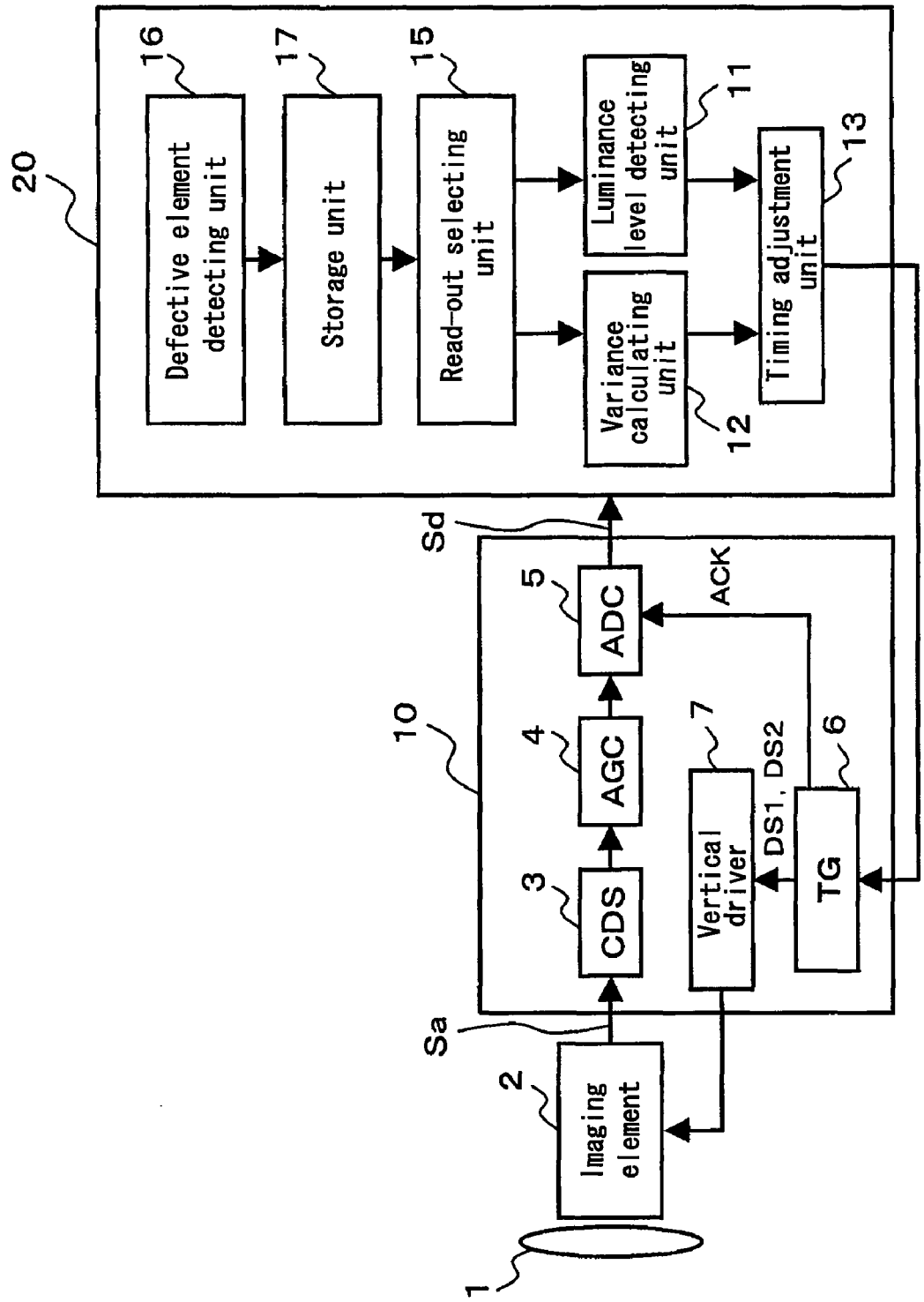
FIG. 14 is a block diagram showing an overall configuration of a digital camera according to a fourth embodiment of the present invention.

FIG. 14 is a view showing an overall configuration of a digital camera according to a fourth embodiment of the present invention. The pixel of the imaging element 2 etc. sometimes include defective pixel caused by manufacturing. At such defective pixel, the signal level tends to be fixed near the maximum value or the minimum value irrespective of the light quantity of the incident light. Therefore, the value of the defective pixel is desirably not used in phase adjustment even if it is within the detection region of each pulse. In the present embodiment, the defective pixel is detected by a defective pixel detecting unit 16, and the address of the defective element is stored in a storage unit 17 in advance, so that the read-out selecting unit 15 does not select the pixel of the address stored in the storage unit 17. Accordingly, the defective pixel is not selected within the read-out range of the data, the defective pixel is not used in phase adjustment and the accuracy of phase adjustment is enhanced.

Fifth Embodiment

Figure 15:
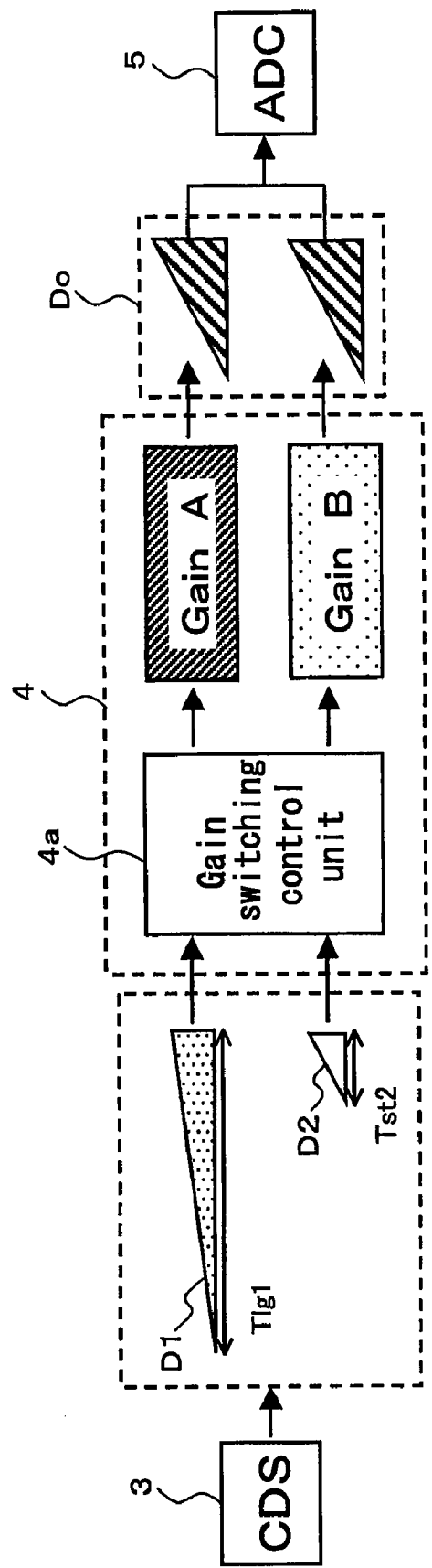
FIG. 15 is a block diagram showing a configuration of an analog front end according to a fifth embodiment of the present invention.

FIG. 15 is a view showing the analog front end 10 according to a fifth embodiment of the present invention. The automatic gain controller 4 includes a gain switching control unit 4a. Whether to apply gain A or gain B for every data with respect to the output from the correlated double sampling unit 3 is selected and switched in the gain switching control unit 4a, and output to the AD converter 5. Accordingly, different gains can be applied to the bright section data D1 and the dark section data D2, where a large gain B is applied to the dark section data D2 to easily detect the variance thereof.

Sixth Embodiment

Figure 16:
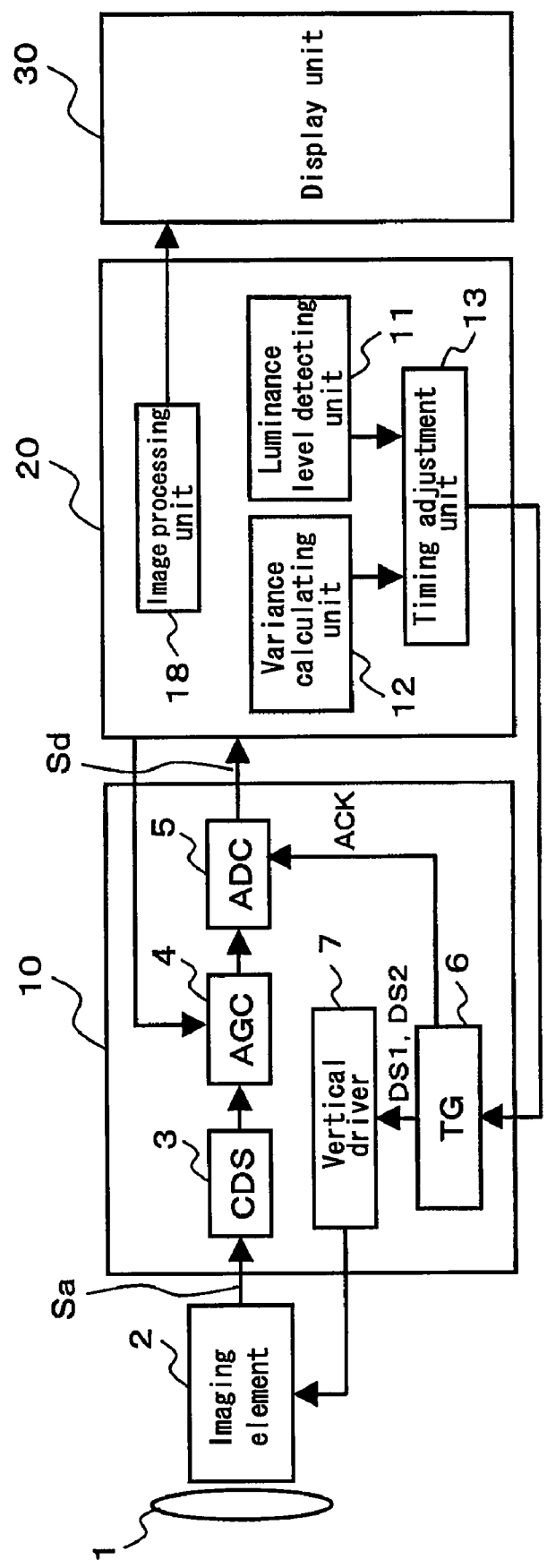
FIG. 16 is a block diagram showing an overall configuration of a digital camera equipped with a display unit according to a sixth embodiment of the present invention.

FIG. 16 is a view showing an overall configuration of a digital camera equipped with a display unit. The data output from the analog front end 10 is processed by an image processing unit 18 and displayed on a display unit 30. If the bright section data and the dark section data exist in one frame, the luminance difference between the dark section data and the bright section data is displayed on the display unit 30 when displaying the image during phase adjustment. In such case, switch is made to the gain A to be applied to the bright section data D1 and to the gain B to be applied to the dark section data D2 in the gain switching control unit 4a of the automatic gain controller 4, so that the level of the output data Do after gain adjustment is made constant and an image without luminance difference can be displayed on the display unit 30 even during phase adjustment. Furthermore, the display state of the display unit 30 may be detected to determine the operation state of the gain switching control unit 4a.

The present embodiment is established irrespective of the first embodiment (light emission pattern control) or the second embodiment (reset pulse mask control).

Although the invention has been described in detail in its most preferred form, it is understood that the present disclosure of the preferred form may be changed in the combination and arrangement of parts without deviating from the spirit and scope of the invention as hereinafter claimed.

What is claimed is:

1. A phase adjusting device for adjusting a phase of a pulse used in imaging in an imaging device based on a digital imaged signal obtained by converting an analog imaged signal from the imaging device to a digital value for every pixel; the phase adjusting device comprising:
   a luminance level detecting unit for detecting a luminance level of the digital imaged signal for a plurality of pixels within a first pixel region of the imaging device;
   a variance calculating unit for calculating a variance indicating signal variation between pixels in the digital imaged signal for a plurality of pixels in a second pixel region of the imaging device; and
   a timing adjustment unit for giving a phase adjustment instruction of the pulse to the imaging device so as to converge to an optimum phase of the pulse set based on the calculation results of the luminance level detecting unit and the variance calculating unit, and controlling the imaging device so that an exposure state of the analog imaged signal is suited for a luminance level detection process by the luminance level detecting unit and a variance calculation process by the variance calculating unit,
   wherein the imaging device includes a reset shift register for providing a reset pulse to each line and a reset mask control unit for controlling the provision of the reset pulse for every line; and
   the timing adjustment unit controls the reset mask control unit to simultaneously acquire the bright section data for the luminance level detection and the dark section data for the variance calculation in one frame.

2. The phase adjusting device according to claim 1, wherein the timing adjustment unit controls the exposure state of the analog imaged signal so that bright section data for the luminance level detection and dark section data for the variance calculation are simultaneously acquired in one frame.

3. The phase adjusting device according to claim 1, wherein
   the imaging device includes a color filter of Bayer array;
   the timing adjustment unit controls the reset mask control unit so that a final output signal of the imaging device is subjected to a masked/non-masked setting by the reset pulse in 2n line units (n is a positive integer).

4. A digital camera comprising:
   an imaging device; and
   the phase adjusting device according to claim 1 for giving a phase adjustment instruction of the pulse used by the imaging device in imaging; wherein
   the imaging device includes,
      a timing generator for generating the pulse,
      an imaging element for generating an analog imaged signal based on the pulse,
      a correlated double sampling unit for performing correlated double sampling on the analog imaged signal and determining a signal level for every pixel,
      an automatic gain controller for adjusting an amplitude of an imaged signal output from the correlated double sampling unit, and
      an A/D converter for converting an imaged signal output from the automatic gain controller to a digital value,
   wherein the imaging device includes a reset shift register for providing a reset pulse to each line and a reset mask control unit for controlling the provision of the reset pulse for every line; and
   the timing adjustment unit controls the reset mask control unit to simultaneously acquire the bright section data for the luminance level detection and the dark section data for the variance calculation in one frame.

* * * * *